(12) United States Patent
Sakas et al.

(10) Patent No.: US 10,152,799 B2
(45) Date of Patent: Dec. 11, 2018

(54) REGISTERING FIRST IMAGE DATA OF A FIRST STREAM WITH SECOND IMAGE DATA OF A SECOND STREAM

(71) Applicants: MedCom Gesellschaft für medizinische Bildverarbeitung mbH, Darmstadt (DE); ESAOTE S.p.A., Genoa (IT)

(72) Inventors: Georgios Sakas, Darmstadt (DE); Velizar Kolev, Darmstadt (DE); Stefano De Beni, Genoa (IT); Leonardo Forzoni, Pistoia (IT)

(73) Assignees: MedCom Gesellschaft für medizinische Bildverarbeitung mbH, Darmstadt (DE); ESAOTE S.p.A., Genoa (IT)

( * ) Notice: Subject to any disclaimer, the term of this patent is extended or adjusted under 35 U.S.C. 154(b) by 40 days.

(21) Appl. No.: 15/389,633

(22) Filed: Dec. 23, 2016

(65) Prior Publication Data
US 2017/0186181 A1    Jun. 29, 2017

(30) Foreign Application Priority Data
Dec. 28, 2015 (EP) .................... 15202840

(51) Int. Cl.
*G06T 7/00* (2017.01)
*G06T 7/33* (2017.01)
(Continued)

(52) U.S. Cl.
CPC .............. *G06T 7/33* (2017.01); *G06T 3/0068* (2013.01); *G06T 7/0012* (2013.01); *G06T 7/38* (2017.01);
(Continued)

(58) Field of Classification Search
CPC ......... G06T 2207/10081; G06T 7/0012; G06T 7/73; G06T 7/0016; G06T 7/246
See application file for complete search history.

(56) References Cited

U.S. PATENT DOCUMENTS

| | | | |
|---|---|---|---|
| 8,923,593 B2 * | 12/2014 | Florent | ................... G06T 7/003 382/132 |
| 2005/0213703 A1 | 9/2005 | Sendai | |
| 2016/0078623 A1 * | 3/2016 | Forzoni | ................. G06T 7/0016 382/103 |

FOREIGN PATENT DOCUMENTS

WO    2011117789 A1    9/2011

OTHER PUBLICATIONS

Wolberg, Image morphing: a survey, The Visual Computer, 1998, pp. 360-372, vol. 14, No. 8-9, Springer-Verlag, New York, New York.

* cited by examiner

*Primary Examiner* — Utpal D Shah
(74) *Attorney, Agent, or Firm* — The Webb Law Firm

(57) ABSTRACT

Provided is a method and arrangement for registering first image data of a first stream with second image data of a second stream. The image data include image information about at least one organ, wherein a shape and/or position of the organ is cyclically changing: Each of the streams include a series of images of the at least one organ at a plurality of different discrete stages of the cyclic change so that each image corresponds to one of the discrete stages. A phase variable defines the stage of the cyclic change and a phase value of the phase variable is assigned to each image within each stream, thereby defining the discrete stage represented by the image. A registration is determined for a pair of (Continued)

images selected by choosing or interpolating images from the first stream and second stream to which a same phase value is assigned.

8 Claims, 3 Drawing Sheets

(51) Int. Cl.
 *G06T 3/00* (2006.01)
 *G06T 7/38* (2017.01)
(52) U.S. Cl.
 CPC ............... *G06T 2207/10016* (2013.01); *G06T 2207/30004* (2013.01); *G06T 2207/30048* (2013.01); *G06T 2207/30061* (2013.01); *G06T 2207/30196* (2013.01)

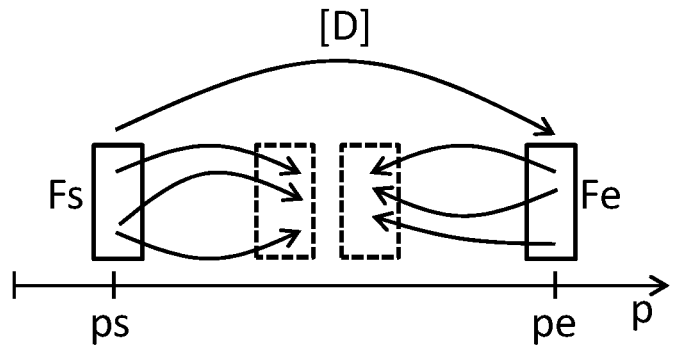
Fig. 3
Fig. 4
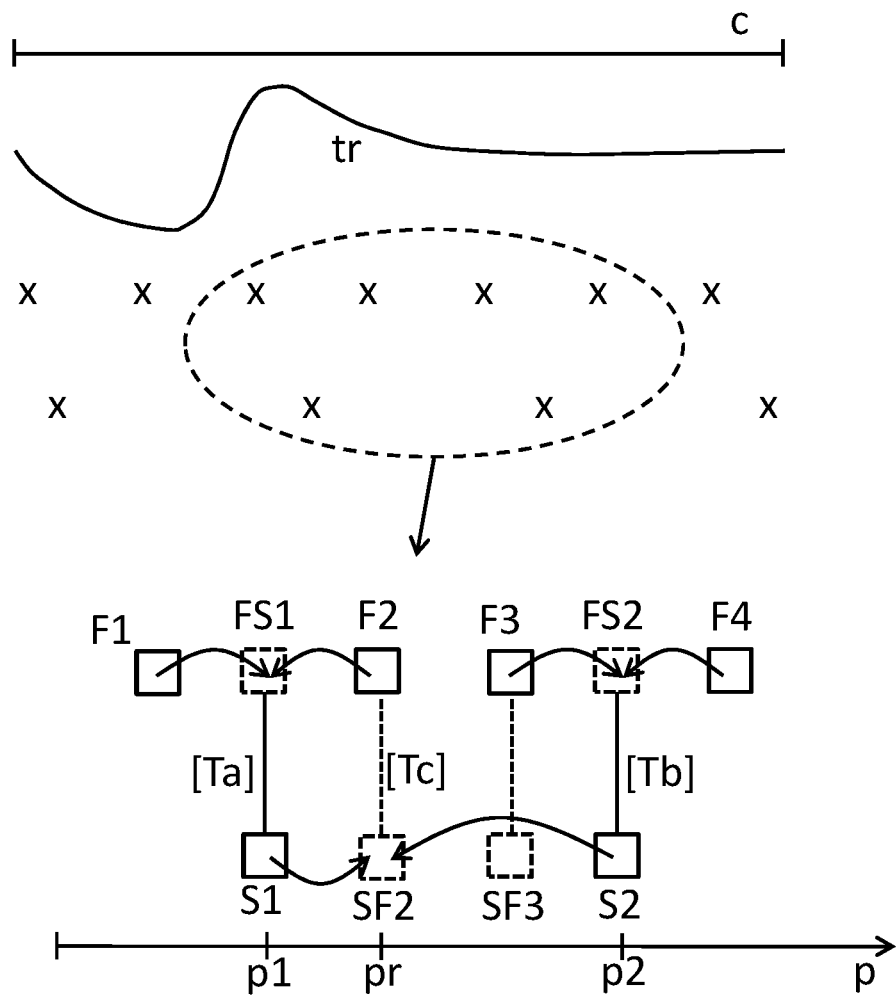

REGISTERING FIRST IMAGE DATA OF A FIRST STREAM WITH SECOND IMAGE DATA OF A SECOND STREAM

CROSS-REFERENCE TO RELATED APPLICATION

This application claims priority to European Patent Application No. 15 202 840.3 filed Dec. 28, 2015, the disclosure of which is hereby incorporated in its entirety by reference.

BACKGROUND OF THE INVENTION

Field of the Invention

The invention relates to a method of registering first image data of a first stream of scans or images (e.g. of a first modality) with second image data of a second stream of scans or images (e.g. of a second modality). The first image data and the second image data comprise image information about a person or animal including image information about at least one organ of the person or animal. The shape of the organ is changing over time.

Description of Related Art

The human body (and also the body of animals) is in general not rigid and can move (i.e. change shape and/or position) during examinations and/or interventions. In addition, some organs move inside the body, even in cases when the body per-se as a whole is not moving. In case of specific organs, the organ movement relative to the body surface is cyclic and sometimes periodic or nearly periodic, for example organ movements caused by breathing, heartbeat and/or blood flow through vessels or organs.

In this description, organs performing repetitive, cyclic movements over time are called "moving organs". Since organs neighboring an organ which undergoes a movement may also be passively moved, the term moving organs shall equally apply to the organ which causes the movement as well as to organs in the neighborhood which are passively moved by other organs.

In case of cyclically moving organs, the organ shape passes through a cycle of different shapes during the "movement cycle": the organ shape and position changes starting from the initial location and shape (i.e. from the start of the cycle) and evolving continuously and steadily over a number of positions and shapes to the most deformed shape and/or most displaced position, where the movement process reverses in order to return back at the end of the cycle to the initial state. Then, a new cycle starts. The range or set of successive physiological conditions or stages (each one associated with a certain shape and position in space within the body), which a moving organ passes through during a movement cycle, is called "phase range" or "range of phase values".

Breathing and heartbeat typically causes periodic or nearly periodic organ movements. By the general term "periodic" the two following different effects are addressed: (a) time-periodic repetition of the movement cycle within a certain, constant time-span which is called "time period" or simply "period", i.e. the constant time duration between two successive movement repetitions; (b) shape-periodic repetition of a continuous process of shape changes within a movement cycle. In shape-periodic movements the duration of the movement cycle may or may not be constant, and in fact in anatomic processes it may vary significantly. However and independently of the time duration of a certain cycle, the shape changes of the organ during said cycle are repeated, i.e. the organ undergoes the same shapes during the movement cycle. The range of shapes which the organ successively passes through during such a movement cycle is called "shape pattern" or "shape range". In contrast, in a perfect periodic movement such as a harmonic oscillation the time duration of all movement cycles is equally long and the shape pattern in all cycles is identical.

The typical cyclic organ movement has two well-defined extreme positions within the cycle: starting from an initial position and shape (which e.g. corresponds to complete exhalation or corresponds to the stage immediately after the heart end systole, etc.), the organ evolves over time to a point of maximum organ deformation and/or position change (which e.g. corresponds to complete inhalation or end of maximum of heart diastole, etc.). Then the organ movement direction is reversed and the organ shape and/or position returns back to its initial position and shape. At least in the case of heartbeat and breathing, such a cycle is then repeated again and again.

It is important to notice that under typical conditions (e.g. absence of severe pathology and/or external mechanical, electrical, pharmacological etc. influence), the time-period of organ movement is not strictly constant, but may vary significantly within physiological ranges (e.g. tachycardia vs. bradycardia, slow vs. fast breathing, exercising, stress, emotions, sleep . . . ). Thus, in terms of time, the organ movement is typically quasi-periodic, not precisely periodic. On the other hand, the shape range shows a much higher periodic stability: under typical conditions, organs pass through the same stages (the same shape and/or location) in each movement cycle. Therefore, organ movement can be seen as quasi-periodic in terms of time, but periodic in terms of shape and/or position.

In state-of-the-art imaging procedures a patient is examined with a plurality of medical imaging devices: CT (computed tomography), MRI (magnetic resonance imaging), PET (positron emission tomography), US (ultrasound) are just some common examples. Each such medical imaging device or instrument is designed for observing certain features of an organ. Such features can be inherently associated with the organ itself e.g. tissue density, water concentration, tissue reflectivity or permeability to sound waves etc., or can be indirect observations e.g. measurement of the concentration of a contrast agent, radio-pharmacon etc. Frequently a plurality of different imaging protocols can be executed with one imaging device, e.g. native or contrast agent CT, single or multi-parameter MRI etc. In other words, not only can an organ be examined by different devices, but also several different types of scans can be performed with the same device, e.g. an MRI can be used to measure water density in T1 or T2 scans, but also diffusion or perfusion coefficient, concentration of contrast agent, etc. In addition, sometimes the same instrument can be used in different space-sampling modes, e.g., one-dimensional (1D), two-dimensional (2D) and three-dimensional (3D) ultrasound. Furthermore, acquisitions of image data can be performed at a specific point in time (e.g. photographs, screenshots, single images, single tomographies etc.) or over a time interval (films, cinematographic loops, 4D CT, 4D MRI etc.).

To avoid confusion we call "modality" the feature of an organ observed with a certain device. Obviously several features can be observed with the same or different instruments or devices. Thus the term modality is associated in our case with a feature rather than with a specific instrument type.

Generally speaking, an acquisition of images samples a body region, an organ or a part of an organ instantaneously (single shot at a certain point of time) or repeatedly (repeated shots at several sequent time points such a film or loops). We call a "scan" a set of values acquired by an image acquisition device and related to a feature of an organ at a certain single point of time in 2D or 3D space. The space thereby is typically discrete (digital images consisting of pixels), but could be also continuous as e.g. in the case of an X-ray film. A more general expression for "scan" is "image", since it also covers the case that the image is generated otherwise than by an image acquisition device (such as an US or MR device), in particular by interpolating scans and/or images or by transforming a scan or image.

In the case that a single value is associated to every space position, the scan or image is called "monomodal scan". In contrast, if multiple values are associated to each space position, the scan or image is called "multimodal scan". Thus, the terms scan and image address both 2D images such as X-rays or ultrasounds, and 3D volumes e.g. tomographies. When mentioning just scan or image, one addresses both, monomodal as well as multimodal scans or images. To be precise, the term "certain single point of time" also includes small time intervals, since the picture elements (pixels) of a scan can be acquired e.g. one after the other or line after line.

A series of scans acquired over consecutive, discrete time-steps is called "stream". A stream can also include other images, in particular images generated by interpolation or transformation of other images. As such, streams have one set of variables describing the position(s) in space and an additional variable describing the point in time. Streams include cine-loops, 4D-CT, 4D-MRI etc. The term "consecutive" includes the case that there is at least one time interval in between the discrete time-steps and that no image data of this particular stream are acquired during the time interval. The image acquisition device may perform other tasks during the time interval, such as acquiring image data of another stream, processing image data and/or transmitting image data. However, it is also possible that the discrete time-steps of acquiring in each case a single scan or image of the stream form a consecutive series of time-steps with no time intervals in between.

Summarizing, but only as an illustrating example, a patient can be scanned by a plurality of devices generating a plurality of modalities at a plurality of occasions at different points of time, e.g. over a time-span of seconds, days, months or years. Frequently, medical procedures for diagnosis or therapy require an association of such datasets acquired with the same device or with different devices and optionally at different times. In particular, the result of a first examination of a patient is to be associated with the corresponding result of a second examination of the patient in a way that corresponding anatomic locations are associated, or overleaped, within the different scans or images. Without losing generality, we refer to "registration" as the creation of location-to-location associations between all anatomically corresponding locations of two individual images. In case of more than two images, the process is pairwise repeated and partial results are concatenated. Today, a plurality of methods is known to enable rigid and non-rigid registration between corresponding images. Obviously registrations can be performed between images of the same imaging modality (e.g. overlap of older and actual CTs), or between different imaging modalities (e.g. overlap MRI and CT). Such multimodal registrations are also called "fusion imaging". For example, CT scans and ultrasound scans can be registered to form fusion imaging scans of a combined modality. In our case we regard mono-modal registrations to be a special case of the more general multi-modal registrations and therefore we refer as fusion imaging to monomodal and multimodal registrations equally.

SUMMARY OF THE INVENTION

The invention particularly relates to medical procedures or applications employing such multi-modal image data, such as navigating a medical instrument, treatment device and/or examining device using image data of a at least a first examination acquired at a given point in time and using image data of at least a second examination, which can also being acquired during the application of the instrument, treatment device and/or examining device. As an example in the case of US, registration can be performed between the current US image shown on a screen and a corresponding image plane of any type of a second modality, which can be an original image acquisition or an interpolated plane.

A registration can be performed in a rigid or non-rigid manner. The result of a rigid registration is called "transformation matrix" (T is often used as its symbol) and the result of a non-rigid registration "deformation field" (D is often used as its symbol). A matrix is defining the same transformation for every (2d or 3D) space location within an image, whereas a deformation field defines explicitly a one-to-one individual relationship between all space locations in the two images. For sake of completeness, it is mentioned here that especially in cases showing fairly coherent displacement, the deformation field can be calculated as sparse field at some key-locations. Registration information at intermediate locations can be generated by means of interpolation.

Organ movements are continuous in space and time, but imaging is typically not: the organ is sampled at defined, discrete time steps. Thereby, sampling (imaging) can take place at timely equidistant steps (e.g. ultrasound cine-loop) either asynchronously to organ movement, or imaging can be triggered by the organ's stage of movement and therefore takes place synchronously to organ movement, resulting to non-timely-equidistant acquisition images (frames) within a stream. In addition, within each single or image the organ is typically discretely sampled at various image locations. Summarizing, streams are typically discrete in both, space and time.

Although, with respect to depth of information, as many images as possible are desired within a stream in order to gain a dense sample series of consecutive shapes within a movement cycle. In practice, the number of images per stream depends on technical (e.g. scanner speed, scanner time available, costs), physiological (e.g. patient condition) and/or medical (e.g. tolerable dose, medical question) parameters. As minimum, for the acquisition of a shape-periodic movement two different scans are required within a movement cycle of an organ. Typically/favorably the scans are taken as close as possible at the movement cycle's extremes, e.g. one at complete inhalation and one at complete exhalation. The exact shape and/or position of an organ are then known only with respect to the times of acquisition. The shape and/or position in-between can only be estimated by interpolation between the acquired scans.

Registration is typically performed pairwise between corresponding individual scans or images, i.e. static datasets acquired on specific points in time and displaying at least partly the same organ or anatomic location. For example, a certain US frame visible on the screen is stored (e.g. by pressing the freeze button) and is registered with the corresponding scan of a second acquisition. This registration can be called "static registration" since the registration is performed between image data representing merely a static condition or stage of organ movement, thus without taking into consideration the organ movement over time.

Such a static registration can be performed consistently over time only in case of static organs, i.e. organs not changing their shape or position over time. In the case of moving organs, static registration results in failures over time: moving organs change their shapes and/or position and therefore the initial static registration is incorrect and should be updated. Ideally, each image within a series of the second stream corresponds to an image of the series of the first stream. In other words, at each examined organ phase, scans or images of both streams are available in the ideal case. Such pair-wise streams (and their corresponding images) should be also pair-wise registered. However in practice a corresponding scan of the other stream is often missing: first and second streams are typically acquired asynchronously to each other and with acquisition devices operating at different frame rates and/or sampling different organ phases. Even if the acquisition devices can be synchronized during some specific time points, in the general case the scans of the different streams correspond to the same organ stage only at discrete points in time.

Beyond and independently of the above-mentioned synchronization problem, the sampling rates of the first and/or second stream may not be necessarily adequate to correctly sample the organ movement. Typically there are less scans per organ cycle than adequate. In extreme cases there are only two scans close to the extrema of the organ movement cycle. Even if one of the streams (e.g. ultrasound) provides scans at an adequate frame rate so that the organ motion can be followed in real-time e.g. on a screen, there may be only a few scans of the second stream (e.g. CT) during said motion cycle. In these cases performing registration for all organ movement stages is problematic since the second stream does not include scans for all time points sampled by the first stream. Hence, registration can be performed explicitly only for the times where both streams synchronously sample the organ—if such synchronous acquisitions exist anyhow. But even in this case it must be updated somehow for the time intervals in-between, in which no corresponding pairs of images of both streams are available.

It is an object of the present invention to provide a method of registering a first organ stream (in particular image data of a first modality) with a second organ stream, (in particular image data of a second modality) wherein the total effort for acquisition of scans is moderate (so that sparse sampling is possible), but nevertheless registration—and therefore fusion—of image data of the different streams can be performed at high precision. It is another object to provide a corresponding arrangement.

It is a basic idea of the present invention to use the phase of the organ movement as the variable defining the evolution of organ shape within the different streams instead of the time of data acquisition, or instead, of the time during the cyclic movement. The term "instead" does not exclude that the time of data acquisition is also stored. Therefore, corresponding scans or images of the different streams can be identified or tagged for pair-wise association using the phase variable rather than the time variable. If interpolation is required or desired in addition or alternatively, the phase instead of the time is used as the independent variable for said interpolation. In particular, the interpolation variable is independent with respect to time.

The phase is a variable that is independent of the time. Each phase value is unambiguously related to the phase (i.e. the stage) of the organ movement, and thereby to the corresponding shape and/or position of the organ. The term "unambiguously" in this context means that for any given phase value the corresponding shape and/or position of the organ can unambiguously be determined. However, the organ may have the same shape and/or position at two different stages within the same period of movement, namely while the organ is expanding and/or moving in a first direction and while the organ is contracting and/or moving in a second direction opposite to the first direction. Therefore, at least two different phase values may be related to the same shape and/or position of the organ in each movement cycle. E.g. when the organ movement is resting (such as at the end of exhalation cycle) and when the process of recording scans and assigning phase values continues, there may be more than two different phase values in a movement cycle related to the same shape and/or position of the organ. Nevertheless, each value of the phase variable, which has been assigned to a scan or image, unambiguously corresponds to certain phase of the organ movement.

For example, the phase may be defined as a dimensionless variable having values in the interval from 0 to 1, wherein the phase value 0 is assigned to the stage at the beginning of a movement cycle and the phase value 1 is assigned to the stage finishing the cycle and just before the next cycle starts again. Alternatively, 0 can be assigned to the start of the movement cycle and 1 to the stage having the most amended shape and/or position. As a third example, 0 can be assigned to any particular position within the cycle and 1 to a later position, the values 0 to 1 being relative coordinates within a certain interval of the cycle.

In particular, there is a plurality of methods capable of identifying and precisely determining (in particular measuring) the organ phase, i.e. the actual physiological condition of an organ during its movement cycle, either by directly observing the organ or by indirectly observing another part of the body or another effect. Such methods capable of identifying and tracking the stage (i.e. the phase) of an organ movement indirectly and/or directly over time are called "organ trackers" or simply "trackers" in this description. The output of a tracker is a signal unambiguously identifying the actual organ phase at a point in time. There are analogue trackers following the organ phase continuously and digital trackers having at least one discrete sampling rate, which is preferably regarded to be adequately high compared to the period of the organ movement cycle. Preferably, at least one tracker is used to determine the phase value(s) of a phase variable used to define the stage of the cyclic change of the organ's shape and/or position. In particular, the tracker assigns values of the phase variable continuously or discrete over time. As an example, an ECG (electrocardiogram) device allows for tracking and determining the cardiac phase continuously over the complete heart beating cycle. As second example, air intake and outlet streams caused by breathing may be guided through at least one valve and the air stream and/or the passing air volume through the valve is measured over time for identifying breathing stage. Tension measuring devices e.g. in stripe form or as a belt around the torso of a person can measure a value corresponding to the breathing phase or the volume inside the lungs. Generally speaking, active or passive optical methods, electromagnetic tracking methods etc. are some examples of how the breathing cycle can be identified and tracked over time.

While the organ's movements with respect to time can vary significantly and therefore cannot be seen generally as being periodic, the movement with respect to the stage of the movement (e.g. with respect to the phase) is more precisely periodic. During a phase-periodic movement cycle, organ phase can be identified and tracked using a tracker. At a specific stage, such as half-way in between complete exhalation and complete inhalation or half-way in between end systole and end of maximum diastole, the shape of the organ is very similar to the shape at the same phase in all other cycles. Therefore, using the phase variable instead of the time variable increases precision of image fusion. As a result, a one-to-one relationship between shape and phase of a moving organ can be created.

In particular, a method is proposed of registering first image data (e.g. at least one scan) of a first stream with second image data (e.g. at least one scan or interpolated image) of a second stream, the first image data and the second image data comprising image information about a person or animal including image information about at least one organ of the person or animal, wherein a shape and/or position of the organ is changing thereby performing a cyclic change of the shape and/or position, and wherein:

each of the first stream and the second stream comprises a series of images of the at least one organ at a plurality of different discrete stages of the cyclic change of the shape and/or position, so that each of the images corresponds to one of the discrete stages of the cyclic change of the shape and/or position, a phase variable is used to define the stage of the cyclic change of the shape and/or position and a phase value of the phase variable is assigned to each of the images within each of the first and second stream, thereby defining unambiguously the discrete stage of the cyclic change of the shape and/or position represented by the image instead of the time during a specific cycle when the image was taken, a registration, i.e. location-to-location associations of image values, is determined for a pair of images consisting of a first image of the first stream and a second image of the second stream, wherein the first image and the second image of the pair are selected by choosing or interpolating an image from the first stream and by choosing or interpolating an image from the second stream to which the same phase value is assigned.

In addition, an arrangement is proposed, in particular for performing the method according to one of the embodiments described, the arrangement being adapted to register first image data of a first stream with second image data of a second stream, the first and the second image data comprising image information about a person or animal including image information about at least one organ of the person or animal, wherein a shape and/or position of the organ is changing thereby performing a cyclic change of the shape and/or position, and wherein the arrangement comprises:

a storage storing the first stream and the second stream, wherein each of the first stream and the second stream comprises a series of images of the at least one organ at a plurality of different discrete stages of the cyclic change of the shape and/or position, so that each of the images corresponds to one of the discrete stages of the cyclic change of the shape and/or position, a data processor adapted to use a phase variable to define the stage of the cyclic change of the shape and/or position and to assign a phase value of the phase variable to each of the images within each of the first and second stream, thereby defining unambiguously the discrete stage of the cyclic change of the shape and/or position represented by the image instead of the time during a specific cycle when the image was taken, a registration device adapted to determine a registration, i.e. location-to-location associations of image values, for a pair of images consisting of a first image of the first stream and a second image of the second stream, wherein the registration device is adapted to select the first image and the second image of the pair by choosing or interpolating an image from the first stream and by choosing or interpolating an image from the second stream to which the same phase value is assigned.

As mentioned above, using the phase variable allows for a fusion of images of the different streams which actually correspond to the same phase of the organ movement, i.e. to the same discrete stage of the cyclic change and, thereby, which correspond to each other precisely.

The invention also includes interpolating images within a single stream: A method of generating an interpolated image of a stream of images of a person or animal, wherein the images comprise image information about at least one organ of the person or animal, wherein a shape and/or position of the organ is changing thereby performing a cyclic change of the shape and/or position, and wherein:

the images of the stream form a series of images of the at least one organ at a plurality of different discrete stages of the cyclic change of the shape and/or position so that each of the images corresponds to one of the discrete stages of the cyclic change of the shape and/or position, a phase variable is used to define the stage of the cyclic change of the shape and/or position and a phase value of the phase variable is assigned to each of the images within the stream thereby defining unambiguously the discrete stage of the cyclic change of the shape and/or position represented by the image instead of the time during a specific cycle when the image was taken, the interpolated image is generated using a first image and a second image of the stream having different assigned phase values, wherein the interpolated image is generated by using the phase variable as interpolation variable and by interpolating image values of the first image and a second image at a desired phase value for which the interpolated image is to be generated.

A corresponding arrangement, in particular for performing the method of the preceding paragraph, is adapted to interpolate images of a stream of images of a person or animal, wherein the images comprise image information about at least one organ of the person or animal, wherein a shape and/or position of the organ is changing thereby performing a cyclic change of the shape and/or position, and wherein the arrangement comprises:

a storage storing images of the stream, wherein the images form a series of images of the at least one organ at a plurality of different discrete stages of the cyclic change of the shape and/or position so that each of the images corresponds to one of the discrete stages of the cyclic change of the shape and/or position, a data processor adapted to use a phase variable to define the stage of the cyclic change of the shape and/or position and to assign a phase value of the phase variable to each of the images within the stream, thereby defining unambiguously the discrete stage of the cyclic change of the shape and/or position represented by the image instead of the time during a specific cycle when the image was taken, an interpolation device adapted to generate an interpolated image using a first image and a second image of the stream having different assigned phase values, wherein the interpolated image is generated by using the phase variable as interpolation variable and by interpolating image values of the first image and a second image at a desired phase value for which the interpolated image is to be generated.

The scans of the first and second streams may be acquired during the same time interval (e.g. the same occasion while the patient is placed nearby the imaging devices) or not (e.g. during different visits of the patient). In particular, the scans of one of the streams may be acquired in advance and the scans of the other stream may be acquired shortly before or during the fusion of scans of the different streams.

In the following it is described that at least one image of one of the given streams is generated by interpolation between scans which have been actually acquired using an imaging device, such as an ultrasound device. Alternatively, the interpolation can be performed between one scan and one interpolated image or between two interpolated images. The interpolation can be performed using the phase value. This kind of interpolation is not restricted to prepare the registration of images of different streams. Rather, interpolation using the phase value can be performed with respect to a single stream and with no further registration step.

The interpolated image may be calculated using the images or scans generated by the imaging device, i.e. scans within the same stream. However, the invention is not restricted to interpolation between images or scans within one of the streams only. Rather, instead or in addition, at least one image can be generated by interpolating between images or scans of the other, second stream. Preferably, multiple images for both streams are generated by interpolation. In particular, a quasi-continuous stream of images can be generated in this manner by continuously interpolating for any desired phase variable value between discrete scans for at least one of the streams, and in particular for both streams. As will be described in more detail later, this can be the basis for a phase-synchronous registration of the images of the two streams. In particular, pair-wise (each pair comprising one image of the first stream and one image of the second stream) registrations of the first and second streams may be established at a plurality of phase values.

In particular, an interpolation may be performed in order to generate a first image (i.e. an image of the first stream) as mentioned above, wherein images of the first stream are considered as outputs of a mathematical function assigning the images in each case to a respective phase value of the phase variable, the phase variable thereby defining an independent interpolation variable of the interpolation, and wherein the first image is generated as an image interpolated at a desired value of the phase variable. Correspondingly, the registration device may be adapted to perform this interpolation. The desired phase value is in particular the phase value which is assigned to both, the first and second image of an image pair. Therefore, at least one of the first and second images can be an interpolated image and the method allows for precise registration of the first and second images, because it uses the phase variable instead of the time variable.

According to a specific embodiment, the interpolation is performed by
  determining the registration of two existing images of the first stream, thereby achieving a description of the location-to-location associations between the two existing images,
  determining an interpolated description of location-to-location associations between one of the two existing images and the first image to be generated at the desired phase value, wherein the desired phase value is within a range of phase values being defined (and in particular limited) by the phase values assigned to the two existing images,
  applying the interpolated description of location-to-location associations to one of the two existing images, thereby generating the first image.

In particular, the two existing images may be consecutive images in the series of images of a stream, in particular of the first stream.

The registration device of the arrangement may be adapted to perform this interpolation. More generally speaking, the description of the registration (e.g. the transformation matrix or the deformation field, see above) can be interpolated in order to generate the first image. In addition or alternatively, the first image can be generated by interpolating image values (such as grayscale and/or color values of the images). In particular, the interpolation may be performed by determining interpolated image values between pairs of image values located at corresponding locations of two existing images, thereby generating the first image. The registration device may be adapted to perform this interpolation.

As mentioned above, images of both streams (either directly acquired or generated by phase-synchronous interpolation) can be used for establishing a registration of the two streams. Theoretically, a single registration between the two streams is sufficient and is valid throughout the complete organ movement cycle. However, in practice this not sufficient in case of low sampling rates and/or if imprecise interpolation methods are applied. Therefore, it is preferred to perform a plurality of inter-stream registrations at different stages within the movement cycle.

In particular, pair-wise (each pair comprising a first image of the first stream and a second image of the second stream) registrations between images of the first and second streams may be established at a plurality of phase values. In addition, the registration results can be the basis for an interpolation. This means that further registration results are achieved in-between the registered image pairs which are not the direct result of a pair-wise registration. Again, the phase variable is used as interpolation variable rather than the time variable.

In particular, according to an embodiment of the method,
  at least two registrations, i.e. location-to-location associations of image values, are determined, namely one registration for each of different pairs consisting in each case of a first image of the first stream and a second image of the second stream, wherein the first image and the second image of each of the different pairs are selected by choosing an image from the first stream and an image from the second stream to which the same phase value is assigned, thereby achieving for each of the different pairs a description of the location-to-location associations between the first image and the second image,
  an interpolated description of location-to-location associations between a first image and a second image of a new pair of images is determined using the phase variable as an independent variable of interpolation, wherein one existing image of the first stream and the second image of the new pair exists (optionally as the result of an interpolation) and the other image of the first stream and the second image of the new pair is to be generated, a desired phase value of the phase variable being assigned to the existing image of the new pair, the other image of the new pair is generated by applying the interpolated description of location-to-location associations to the existing image.

As for the other embodiments of the method, the arrangement (and in particular the registration device) may be adapted to perform this embodiment.

It should be noted that, in particular in case the acquisition time being longer than the organ movement repetition time, there may be different scans within the same stream taken at different cycles of the organ movement. Therefore, the first stream and/or the second stream may comprise a plurality of images having the same assigned phase value. In this case, one of the images having the same assigned phase value, or alternatively, an image resulting from processing the images having the same assigned phase value, may be used for registration and/or interpolation.

In particular, the stage of the cyclic change of the shape and/or position is observed using a tracker (see above) and output values of the tracker are used to assign the phase values of the phase variable to each of the images within each stream.

BRIEF DESCRIPTION OF THE DRAWINGS

Examples of the invention will be described with reference to the attached figures.

DETAILED DESCRIPTION OF THE INVENTION

Figure 1:
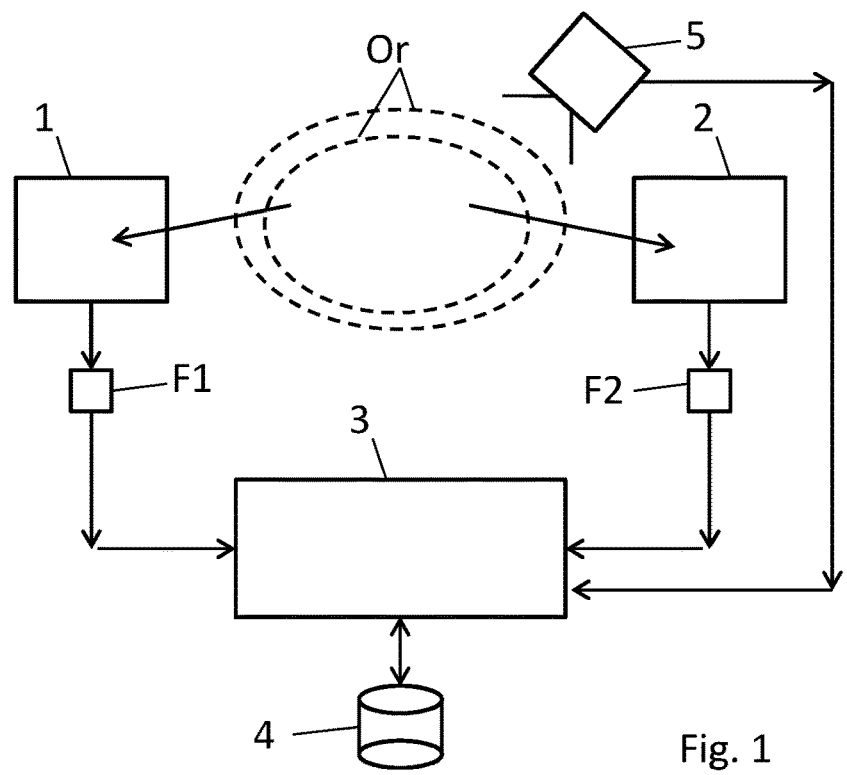
FIG. 1 an arrangement for the registration of image data of different streams, FIG. 2 scans during a cycle of organ movement and an enlarged view of two of the scans illustrating interpolation based on interpolating a transformation matrix, FIG. 3 a view similar to lower part in FIG. 2 for illustrating an interpolation based on a deformation field, FIG. 4 samples of two different streams and—at the bottom part—an enlarged view of some of the samples for illustrating interpolation and registration at different phase values, FIG. 5 a diagram with an example of the phase variable as a function of time in case of a non-harmonic oscillation movement of the organ and FIG. 6 a diagram with an example of the phase variable as a function of organ shift position in case of a non-harmonic oscillation movement of the organ.

FIG. 1 schematically shows an organ Or which performs a movement cycle. During the cycle, the shape and position of the organ is changing continuously. Illustrated are two circumferential lines of the organ at different stages of the movement cycle.

Two different imaging devices 1 and 2 repeatedly acquire scans of the organ Or. Therefore, images of two different streams are produced by operating the imaging devices 1 and 2. Other than shown, the different imaging devices 1 and 2 may not be present at the same time, although this is also possible. The first imaging device 1 produces scans and thereby first images F1 which form a first stream. Similarly, the second imaging device 2 produces scans and thereby second images F2 which form a second stream. The first and second images F1, F2 (in particular images of different imaging modalities belonging to the first stream or second stream respectively) are transferred to a device 3 which may be a computer. More generally speaking, the device 3 is adapted to process the streams received from the first and second imaging devices 1, 2. Device 3 may also produce further images of the first and/or second streams by interpolation and/or may produce image data of a third modality from the first and/or second stream.

Device 3 comprises a registration device for registering different images of the same stream and/or for registering pairs of images from the different streams. Device 3 may comprise different devices, such as a data processor for assigning a phase value to each of the images of the different streams and a registration device or a plurality of registration devices for performing the registration mentioned. However, it is also possible that the same data processor performs the phase value assignments and the registration(s). In any case, device 3 is connected with a data storage 4 for storing and retrieving images of the two streams. Some of these images are acquired scans and some of these images may be interpolated images. In addition, some of these images may be generated using an existing image of one of the streams and registration information concerning the two streams for generating an image of the other stream from the existing image.

Furthermore, device 3 may be connected to at least one screen (not shown in FIG. 1) for representing at least one of the images to users, such as physicians. In particular, device 3 may combine corresponding images of the different streams having the same assigned phase value. This combination can be called "fusion". In particular, the fused images may be displayed on the screen and/or may be output to another device.

A tracker 5 tracks the organ movement (called also stage or phase) and a corresponding tracker signal is transferred to the device 3. Therefore, device 3 can assign a corresponding phase value to each of the images. According to a first embodiment of operating imaging devices, a time value (or time stamp) can be assigned to each of the images F first and the device 3 can assign the phase value resulting from the tracker operation later, for example under consideration of the time when the corresponding tracker signal value was produced. However, according to another embodiment other than shown in FIG. 1, each scan within a stream may be assigned to a tracker signal value or to the corresponding phase value when the corresponding scan is generated by the imaging device. In this case, the tracker would be directly or indirectly connected to the imaging device or to the imaging devices.

In the following description, different images F are mentioned. Typically there is a plurality of different images F of the same stream or of different streams. If one of the images F corresponds to the start of the movement cycle or corresponds to the start of a part of the movement cycle of the organ, it is denoted by Fs. If the image F corresponds to the end of the movement cycle or to the end of the part of the movement cycle, it is denoted by Fe. The corresponding phase values are denoted by ps for the start and by pe for the end of the cycle or part of the cycle respectively. This means that the phase value ps is assigned to the start image Fs and the phase value pe is assigned to the end image Fe.

Figure 2:
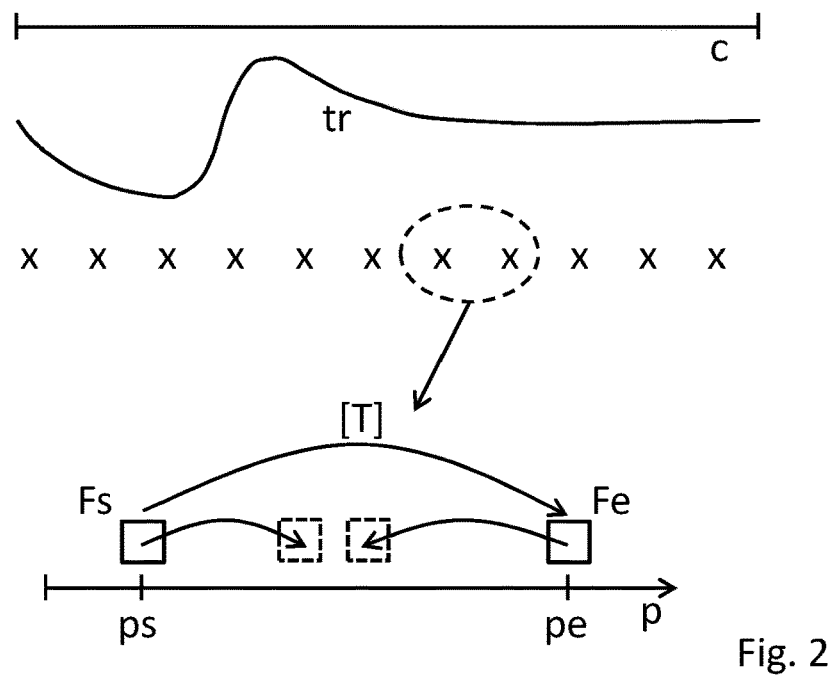

As illustrated in the upper part of FIG. 2 and similar in the upper part of FIG. 4, the duration of the movement cycle c is represented by a horizontal line. During the movement cycle, a tracker (not shown in FIG. 2 and FIG. 4) produces a tracker signal tr. The tracker signal tr corresponds to the phase or stage of the organ movement or comprises the information to determine the phase. Examples of trackers were described above.

Furthermore, different kinds of interpolation will be described in the following. Each interpolation has an independent interpolation variable, which is, according to the invention, the phase value. For simplicity, the phase value is denoted by tr like the tracker signal. However, it is possible to process the tracker signal in order to achieve the phase value. As an example of processing, the tracker signal tr may be integrated over time staring e.g. at the start of the movement cycle in order to produce the phase value. In the following the interpolation variable I=1−(te−tr)/(te−ts) with 0<=I<=1 will be used, wherein te is the phase value at the end of the cycle or of a part of the cycle and ts is the phase value at the beginning or start of the cycle or of the part of the cycle. The interpolation variable I is also a phase variable, namely a normalized phase variable. Furthermore, P(x, y) and F(x, y) will be used to denote the position P( ) and the image value F( ) as spatial functions of the spatial variables x, y. In case of volumetric image data, there would be a third spatial variable z for the third spatial dimension. The image value F (x, y) may be, for example, a greyscale value or a color value.

As mentioned above, a phase-continuous stream of images can be generated for at least one of the modalities by generating images at phase values for which no acquired scan exists. In particular, the interpolation variable I can be used for generating interpolated images at all desired phase values. There are different ways of performing the interpolation. In particular it can be distinguished between location interpolations on one hand and image value interpolations (in particular greyscale value interpolations) on the other hand. Location interpolation (which may be called alternatively "position interpolation") means that locations within the space (typically a two-dimensional of three-dimensional space) of the respective image F are shifted, whereas their grey-value remains unchanged. This location interpolation is based on the assumption that image elements (e.g. pixels or voxels) are associated with an anatomic location (i.e. with an element or zone of the organ). Therefore, the image elements at the respective locations follow the organ movement, thereby their value (e.g. greyscale) remains constant. Image value interpolations, and in particular greyscale value interpolations, are based on the fact that the image value at a fixed location within a volume or plane changes due to the organ movement. This means that different elements or zones of the organ move through the fixed location during the cyclic organ movement.

The middle part of FIG. 2 schematically shows a sequence of acquired scans, each scan indicated by an "x". The position of each scan indicated by the corresponding x in the horizontal direction in FIG. 2 corresponds to the stage within the cycle c and also corresponds to the corresponding value of the tracker signal tr. The eleven scans indicated in FIG. 2 are not sufficient for a quasi-continuous stream of images representing the cyclic movement of the organ. The scans indicated in FIG. 2 are, in the example described here, scans of one stream.

In the lower part of FIG. 2 the situation in the range between two of the acquired scans enclosed by a dashed oval line in the middle part of FIG. 2 is shown in more detail. An image has been generated for each of the two acquired scans and the movement cycle starting with the phase value ps and ending with the phase value pe is considered. As mentioned above, the image Fs is the result of the scan at the phase value ps and the image Fe is the result of the scan at the phase value pe. The axis of the phase p is illustrated by an arrow.

It is now desired to generate additional images by interpolation. As examples, two additional images are indicated by in each case one square having a dashed circumferential line. By interpolation, more than these two additional images may be generated.

According to a very simple approach, said interpolation can be performed by copying the acquired scan Fs in the range from phase value ps to phase value (pe−ps)/2. In this manner, an arbitrary number of desired additional images can be generated and the respective phase value in the mentioned range is assigned to each of these additional images. In a similar manner, the acquired scan Fe is copied within the range from (pe−ps)/2 to pe as many times as desired and the respective phase value is assigned to each of the copies. However, this kind of very simple interpolation is only adequate if the range from phase value ps to phase value pe is small, or if the shape change within the range between ps and pe is small. In other cases visible artifacts marked as jumps from one image to the other will become visible when crossing the middle of the cycle, i.e. at p=(pe−ps)/2.

An improved form of interpolation is therefore performed using the location interpolation approach mentioned above. As shown in the lower part of FIG. 2, a registration of the images Fe and Fs is performed and the result is a transformation matrix [T]. This means that a rigid registration is determined. In some cases, in particular if the phase range interval from ps to pe is large and/or if the organ deforms rather than simply changes its position within the patient, a rigid transformation may be inappropriate and a deformation field should be determined instead of a transformation matrix. This case will be described with reference to FIG. 3 later.

In the case illustrated in the lower part of FIG. 2, the two images illustrated by the squares with dashed circumferential lines are generated starting with the values of Fs and Fe respectively by matrix interpolation. In the following equations, [1] represents the unit-diagonal matrix having the matrix element 1 in the diagonal and having the matrix element 0 elsewhere. In particular two different ways of matrix interpolation are performed for the first half of the range of phase values and for the second half of the range of the phase values:

$$Fr(x,y)=Fs(x,y)*([1]+I*[T]), \text{ for } I<=0.5$$

$$Fr(x,y)=Fe(x,y)*([1]+(1-I)*[T]^{-1}), \text{ for } I>0.5$$

In the above two equations, Fr(x, y), Fs(x, y) and Fe(x, y) represent the image values of the resulting interpolated image Fr, of the start image Fs and of the end image Fe. The symbol $[T]^{-1}$ represents the inverse of the transformation matrix [T]. Alternatively, either the first of the two equations or the second of the two equations can be used for the whole range from ps to pe, i.e. for the whole range of the interpolation variable I. Since the above described interpolation only shifts the position of the image values without altering the grey scales, the interpolation is a location interpolation.

Another form of location interpolation is illustrated in FIG. 3. Instead of a rigid registration, a non-rigid registration of the images Fs, Fe is performed and a resulting deformation field [D] is obtained. From the deformation field [D], a spatial vector V(x, y) can be determined for each location within one of the two registered images. The vector V(x, y) points from this location of the image to a location in the other of the two registered images. In general, the two locations connected by the vector are different locations, otherwise there would be no deformation defined by the deformation field [D]. However, some locations may not be shifted by the deformation field [D]. In this case, the respective vector V(x, y) points from one location in one of the images to the same location in the other image.

As illustrated in FIG. 3, different vectors point from locations in the start image Fs to a generated image illustrated by a rectangle having a dashed circumferential line and different vectors point from locations of the end image Fe point to locations in another generated image illustrated by a rectangle having a dashed circumferential line. Similar to the equations defined above for a transformation matrix interpolation, the following two equations define an example of deformation field interpolation, namely for the two halves of the phase value range or interpolation variable range:

$Fr(x,y)=Fs(x,y)+I*V(x,y)$, for $I<=0.5$ $Fr(x,y)=Fe(x,y)+(1-I)*V(x,y)$, for $I>0.5$ As for the transformation matrix interpolation, only one of the equations describing the deformation field interpolation may be used for the whole range of the interpolation variable I. The second equations of deformation field interpolation contains the factor (1−I) which means that a reversed vector V(x, y) multiplied by the respective value of the factor (1−I) is used in order to calculate the image values of the resulting image Fr.

In addition or alternatively to the transformation of initial space locations (in an existing image) to final space locations (in an interpolated image to be generated), the image values contained within the start and the end images Fs and Fe (in particular greyscale values) can be interpolated as mentioned above in the range of phase values. Again, the interpolation variable I can be used.

The classical deformation theory is assuming that image values (for example pixels or voxels) are representing anatomy features (e.g. tissue type) of a patient and therefore do not change significantly by a rigid or deformable change in organ shape and/or location. This assumption can be true or not: as an example, ultrasound greyscales depend not only on the tissue type, but also on its orientation towards the transducer. During the acquisition of a moving organ, the orientation of the identical organ portion may change resulting in an assignment of different grey values to the identical anatomical region within an organ. Such grey level variations within a cycle result in visible gaps if said grey levels are not also interpolated accordingly. Therefore, interpolating image values between the start phase value ps and the end phase value pe is the more general case, since it includes the previously mentioned situation where the grey value at a given anatomic position remains constant during the movement cycle as a special case. In all of the above mentioned cases of interpolation and along the vector connecting locations of a pair of locations within the start image Fs and the end image Fe, the image value Fr(x,y) of the resulting image can calculated as follows:

$Fr(x,y)=(1-I)*Fs(x,y)+I*Fe(x,y)$,

This "image value interpolation" results in smoother transitions between consecutive generated images.

In the following, examples of inter-stream interpolation are described. Here, images of two streams, i.e. there are first images (of a first stream) and second images (of a second stream) are observed. At least one of the streams comprises scans acquired by an imaging device (acquired scans) and optionally a plurality of interpolated images in-between them, so that always one of these images can be used as corresponding image at the same phase value of the other stream. In particular, one of the streams comprises a phase-continuous or quasi-continuous stream.

FIG. 4 shows in its upper part the extension of the organ's movement cycle c and a corresponding tracker signal tr in the same manner as shown in FIG. 2. In the middle part of FIG. 4 there are two sets of image data. Each acquired scan is indicated by an "x". One stream, the images of which are represented by the upper line of "x", comprises seven images and the other stream comprises only four images.

The situation of the central images of both streams is shown in the lower part of FIG. 4 and an example of inter-stream interpolation is explained.

Since the two streams observe the same organ and since their images are related to each other using the phase variable, it could be assumed that a single registration is sufficient to perform registrations between images of the different streams corresponding to each other, i.e. having the same phase value, at any stage of the movement cycle. However, more precise results of registration between both streams are achieved if more than one inter-stream registration is performed. In the example of FIG. 4, two inter-stream registrations are performed, but in practice more than two inter-stream registrations may be performed, in order to generate high quality registration between the two streams.

In the general case we may regard both streams as being phase-continuous streams, i.e. we can generate at any desired location of the phase variable p an image in the first stream and a corresponding image in the second stream. Alternatively, one of the two images mentioned above may be an acquired scan, whereas the second image will be an interpolated image because in the general case the two streams will not be perfectly synchronized. Starting with at least two corresponding scan-pairs as above, rigid or non-rigid registrations are performed, each registration based on a pair of images, one of the first stream and one of the second stream.

In a favorable constellation the stream with the sparser image density (called here the "sparse stream" and shown for example as the lower image series of FIG. 4) can be employed e.g. as discrete stream and the second stream with the denser sampling density (called here the "dense stream" and shown for example as the upper image series in FIG. 4) can be regarded e.g. as a phase-continuous stream. In this constellation, at any organ stage (phase) for which an acquired scan of the sparse stream exists and by employing the corresponding phase variable p, a corresponding image can be either identified as an acquired scan in the dense stream or can be generated in the dense stream by interpolation. Since the dense stream has a comparatively high image density, the error caused by the interpolation is small.

In the example of FIG. 4 sparse stream acquired scans are indicated by S1, S2 and dense stream acquired scans are indicated by F1, F2, F3, F4, whereas interpolated images of the dense stream are denoted as FS1, FS2 and interpolated images of the sparse stream are denoted by SF2, SF3. The arrows at the level of the images of the dense stream and the arrows at the level of the images of the sparse stream illustrate the intra-stream interpolations.

In particular, the starting image F1 of the four scans of the dense stream in the enlarged view at the bottom of FIG. 4 and the consecutive image F2 of the dense stream can be used to generate the interpolated image FS1 of the dense stream, for example in one of the manners described above. In the same manner, the image F3 and the consecutive end image F4 of the dense stream can be used to generate a second interpolated image FS2 of the dense stream. In particular, an interpolated image can be generated at every phase value p for which an acquired scan S of the sparse stream exists.

In the example shown in FIG. 4, interpolated images FS1 and FS2 are generated in the dense stream at values p1 and p2 of the phase value p corresponding to the original images S1 and S2 within the sparse stream. In particular, pair-wise registrations can be applied between corresponding scans S1, S2 from the sparse and the interpolated images FS1 and FS2 of the dense stream. These registrations are indicated by the two continuous vertical lines on the left hand side and on the right hand side of the lower part of FIG. 4. In the example shown, the registrations result in a transformation matrix as indicated by the symbols [Ta], [Tb]. Alternatively, the registration results can be deformation fields [Da], [Db] (not shown in FIG. 4). Such transformation matrices or deformation fields indicate the way an image in the sparse stream must be transformed in order to geometrically fit over the corresponding (acquired or interpolated) image in the dense stream. Obviously such transformations registering images between different streams are solely shifting field values, e.g. grey levels, of one stream over the other without changing their values.

In a further step in the process of performing an inter-stream registration, interpolated images SF2, SF3 are generated by interpolating between the acquired scans S1, S2 of the sparse stream at a phase value pr (in particular at every phase value) for which an acquired scan F2, F3 of the dense stream exists in between the phase values of the start image F1 and the end image F4 of the dense stream.

In the final step of the inter-stream registration the results of the two registrations (here: the registration matrices [Ta] and T[b]) are interpolated at the phase value of any acquired scan F2, F3 (in particular: at every desired value of p between p1 and p2) of the dense stream. At a desired phase value pr, the interpolated registration result is obtained (here: a transformation matrix [Tc]). Using this interpolated registration result, as illustrated by a third and fourth vertical dashed lines in the example of FIG. 4, this said interpolated registration information is used to transform the interpolated images SF2, SF3 etc. of the sparse stream over the scans F2, F3 etc. of the dense stream.

In order to determine the interpolated registration [Tc], [dT]=[Tb]−[Ta] can be calculated as gauge of the registration change over the cycle or range of the cycle, in case of a rigid registration. This difference transformation matrix [dT] differs from the example illustrated in FIG. 4, since, in the following equations, [Ta] and [Tb] denote the registration matrices at the start and end of a range of phase values. The interpolated registration matrix [Tc] can be calculated as follows for an arbitrary desired phase value pr or tracker signal value tr:

$$[Tc]=[Ta]+I*[dT]=(1-I)*[Ta]+I*[Tb]$$

In case of non-rigid registration, a difference deformation field [dD]=[Db]−[Da] is calculated instead. It represents the difference field of the displacement vectors for images S1 and S2 at the start and end of the range of phase values. The interpolated deformation field results—i.e. the resulting values [Dc](x,y)—can then be calculated as follows for an arbitrary desired phase value pr or tracker signal value tr:

$$[Dc](x,y)=[Da](x,y)+I*[dD](x,y)=(1-I)*[Da](x,y)s+I*[Db](x,y)$$

Figure 5:
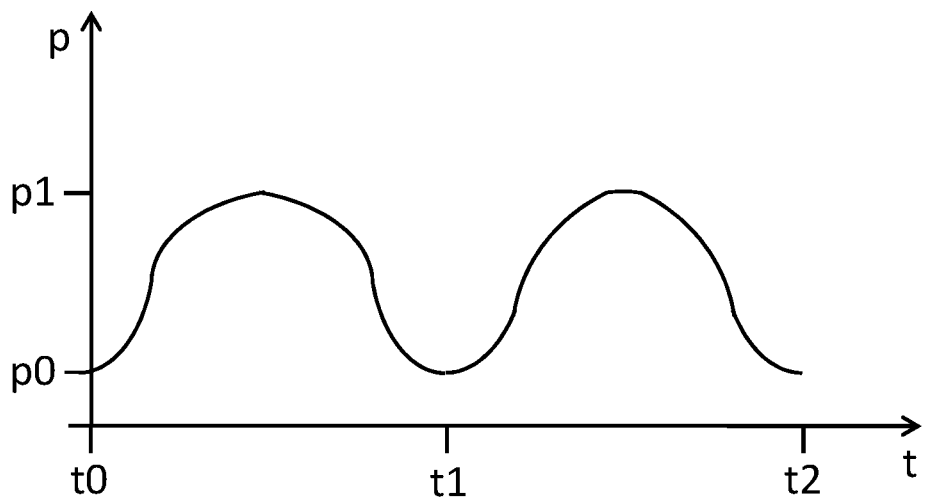

In the following, examples of the phase variable are described. FIG. 5 shows for two cycles of organ movement the phase variable p as a function of time t. The development of the phase shown here for illustration of an example is similar to a sinus function, but clearly differs from an ideal sinus function. In addition, the function in the first cycle starting at time t=t0 and ending at time t=t1 differs from the function in the second cycle starting at time t=t1 and ending at time t=t2. In the first cycle, the initial development of the phase value from its minimum value p0 towards its maximum value p1 is more progressive compared to the second cycle. Furthermore, the cycle length of the cycles may differ. Consequently, the stage of the organ movement cannot the determined precisely using the time variable t.

Figure 6:
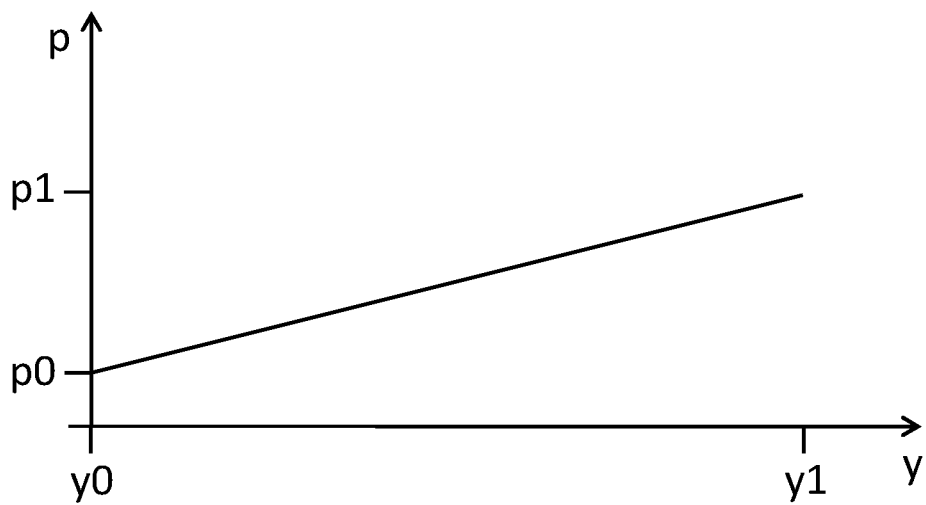

In contrast, as illustrated in FIG. 6, the phase variable is a variable precisely defining the corresponding stage of the organ movement. In FIG. 6, the shift position y of the cyclic organ movement is shown along the horizontal axis. The phase p as a function of organ shift position y is—in this specific example—an exactly linear function with constant slope. This means that the phase value starts with its minimum value p0 at the start of the cycle (shift position y0) and develops linearly with (proportional to) the shift position y until reaching the maximum shift position y1 at phase value p1. In the second half of each cycle the phase variable p develops in the opposite direction along the graph shown in FIG. 6 and the same development applies to every cycle having the same extreme shift positions y0 and y1.

However in general, the phase variable is not a linear function of the shape and/or position of the organ. For example, a typical tracker may be used which produces an output signal, which does not develop linearly with the shape and/or position. In any case, the phase variable is independent of the development of the organ shape and/or position with time, since each phase value is unambiguously assigned to an organ shape and/or position.

The invention claimed is:

1. A method comprising: registering first image data of a first stream with second image data of a second stream, the first image data and the second image data comprising image information about a person or animal including image information about at least one organ of the person or animal, wherein a shape and/or position of the organ is changing thereby performing a cyclic change of the shape and/or position, and wherein each of the first stream and the second stream comprises a series of images of the at least one organ at a plurality of different discrete stages of the cyclic change of the shape and/or position so that each of the images corresponds to one of the discrete stages of the cyclic change of the shape and/or position;

defining the stages of the cyclic change of the shape and/or position using a phase variable and assigning a phase value of the phase variable to each of the images within each of the first and second stream thereby defining unambiguously the discrete stage of the cyclic change of the shape and/or position represented by the image instead of a time during a specific cycle when the image was taken;

determining a registration comprising location-to-location associations of image values, for a pair of images comprising a first image of the first stream and a second image of the second stream, wherein the first image and the second image of the pair are selected by choosing or interpolating an image from the first stream and by choosing or interpolating an image from the second stream to which a same phase value is assigned determining at least two registrations comprising location-to-location associations of image values, the at least two registrations comprising one registration for each of different pairs of images, each different pair comprising a first image of the first stream and a second image of the second stream, wherein the first image and the second image of each different pair are selected by choosing or interpolating an image from the first stream and by choosing or interpolating an image from the second stream to which a same phase value is assigned, thereby achieving for each different pair a description of the location-to-location associations between the first image and the second image;

determining an interpolated description of location-to-location associations between a first image and a second image of a new pair of images using the phase variable as an independent variable of interpolation, wherein one existing image of the first image and the second image of the new pair exists as an acquired image and/or as a result of an interpolation, and the other image of the first image and the second image of the new pair is to be generated, a desired phase value of the phase variable being assigned to the existing image; and generating the other image by applying the interpolated description of location-to-location associations to the existing image.

2. The method of claim 1, further comprising generating the first image by performing an interpolation, wherein images of the first stream are considered as outputs of a mathematical function assigning the images in each case to a respective phase value of the phase variable, the phase variable thereby defining an independent interpolation variable of the interpolation, and wherein the first image is generated as an image interpolated at a desired phase value of the phase variable.

3. The method of claim 2, further comprising performing the interpolation by determining the registration of two existing images of the first stream, thereby achieving a description of the location-to-location associations between the two existing images;

determining an interpolated description of location-to-location associations between one of the two existing images and the first image to be generated at a desired phase value, wherein the desired phase value is within a range of phase values being defined by the phase values assigned to the two existing images; and applying the interpolated description of location-to-location associations to one of the two existing images, thereby generating the first image.

4. The method of claim 2, further comprising performing an interpolation to determine interpolated image values between pairs of image values located at corresponding locations of two existing images, thereby generating the first image.

5. The method of claim 1, further comprising observing the stage of the cyclic change of the shape and/or position using a tracker, and assigning the phase values of the phase variable to each of the images using output values of the tracker.

6. An arrangement for performing the method of claim 1, the arrangement configured to register first image data of a first stream with second image data of a second stream, the first image data and the second image data comprising image information about a person or animal including image information about at least one organ of the person or animal, wherein a shape and/or position of the organ is changing thereby performing a cyclic change of the shape and/or position, the arrangement comprising:

a storage configured to store the first stream and the second stream, wherein each of the first stream and the second stream comprises a series of images of the at least one organ at a plurality of different discrete stages of the cyclic change of the shape and/or position so that each of the images corresponds to one of the discrete stages of the cyclic change of the shape and/or position;

a data processor configured to define the stages of the cyclic change of the shape and/or position by using a phase variable and further configured to assign a phase value of the phase variable to each of the images within each of the first and second stream, thereby defining unambiguously the discrete stage of the cyclic change of the shape and/or position represented by the image instead of a time during a specific cycle when the image was taken; and a registration device configured to determine a registration comprising location-to-location associations of image values for a pair of images, the pair comprising a first image of the first stream and a second image of the second stream, the registration device further configured to select the first image and the second image of the pair by choosing or interpolating an image from the first stream data and by choosing or interpolating an image from the second stream to which a same phase value is assigned, wherein the registration device is further configured to determine at least two registrations comprising location-to-location associations of image values, namely one registration for each of different pairs of images, each different pair comprising a first image of the first stream and a second image of the second stream, and select the first image and the second image of each different pair by choosing or interpolating an image from the first stream and by choosing or interpolating an image from the second stream to which a same phase value is assigned, thereby achieving for each different pair a description of the location-to-location associations between the first image and the second image;

determine an interpolated description of location-to-location associations between a first image and a second image of a new pair of images using the phase variable as an independent variable of interpolation, wherein one existing image of the first image and the second image of the new pair exists as an acquired image and/or as a result of an interpolation and the other image of the first image and the second image of the new pair is to be generated, a desired phase value of the phase variable being assigned to the existing image of the new pair; and generate the other image of the new pair by applying the interpolated description of location-to-location associations to the existing image.

7. The arrangement of claim 6, wherein the registration device is configured to perform an interpolation in order to generate the first image, wherein images of the first stream are considered as outputs of a mathematical function assigning the images in each case to a respective phase value of the phase variable, the phase variable thereby defining an independent interpolation variable of the interpolation, and wherein the first image is generated as an image interpolated at a desired phase value of the phase variable.

8. The arrangement of claim 6, wherein the arrangement comprises a tracker configured to observe the stage of the cyclic change of the shape and/or position and to output values to be assigned as the phase values of the phase variable to each of the images.

* * * * *